United States Patent
Dippold et al.

(10) Patent No.: US 9,434,298 B2
(45) Date of Patent: Sep. 6, 2016

(54) DIRECTION INDICATOR CIRCUIT FOR CONTROLLING A DIRECTION INDICATOR IN A VEHICLE

(71) Applicant: Infineon Technologies AG, Neubiberg (DE)

(72) Inventors: Gebhart Dippold, Finkenstein (AT); Stephane Fraisse, Munich (DE); Robert Illing, Villach (AT); Albino Pidutti, Martignacco (IT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 209 days.

(21) Appl. No.: 14/036,031

(22) Filed: Sep. 25, 2013

(65) Prior Publication Data

US 2014/0085075 A1   Mar. 27, 2014

(30) Foreign Application Priority Data

Sep. 25, 2012   (DE) .................. 10 2012 018 942

(51) Int. Cl.
*B60Q 11/00*   (2006.01)
*B60Q 1/34*   (2006.01)
*B60Q 1/38*   (2006.01)

(52) U.S. Cl.
CPC .............. *B60Q 1/34* (2013.01); *B60Q 1/382* (2013.01)

(58) Field of Classification Search
CPC ........................................ B60Q 1/34
USPC .............. 340/463, 468, 475; 315/77, 287; 327/419; 361/78, 79, 86; 323/282
See application file for complete search history.

(56) References Cited

U.S. PATENT DOCUMENTS

| | | | | |
|---|---|---|---|---|
| 4,816,818 A * | 3/1989 | Roller | ............................ | 340/475 |
| 5,247,280 A * | 9/1993 | Brooks | .......................... | 340/458 |
| 5,374,920 A | 12/1994 | Evens | | |
| 5,444,595 A * | 8/1995 | Ishikawa et al. | ............... | 361/86 |
| 5,805,061 A | 9/1998 | Fritz et al. | | |
| 6,700,432 B2 | 3/2004 | Misdom et al. | | |
| 2010/0127677 A1 | 5/2010 | Ohshima | | |
| 2012/0280807 A1* | 11/2012 | Kulkarni | ........................ | 340/475 |

FOREIGN PATENT DOCUMENTS

| | | |
|---|---|---|
| DE | 4137611 A1 | 5/1993 |
| DE | 4224588 A1 | 2/1994 |
| DE | 60129778 T2 | 6/2008 |

OTHER PUBLICATIONS

English abstract of DE4224588A1, dated Feb. 3, 1994.

\* cited by examiner

*Primary Examiner* — Brent Swarthout

(57) ABSTRACT

In various embodiments, a direction indicator circuit for controlling a direction indicator in a vehicle is provided. The direction indicator circuit may include: a first terminal for connecting to a supply voltage; a second terminal for connecting to a direction indicator switch and a lighting means; a third terminal for connecting to a capacitor; and a switch for providing a current, wherein the switch is connected to the first terminal and to the second terminal; wherein the direction indicator circuit is designed to provide the lighting means with a current during an on state using the switch and with no current during an off state; wherein during the on state the direction indicator circuit checks the provided current at least once and goes into the off state if the check detects a current which is lower than a predefined current.

7 Claims, 6 Drawing Sheets

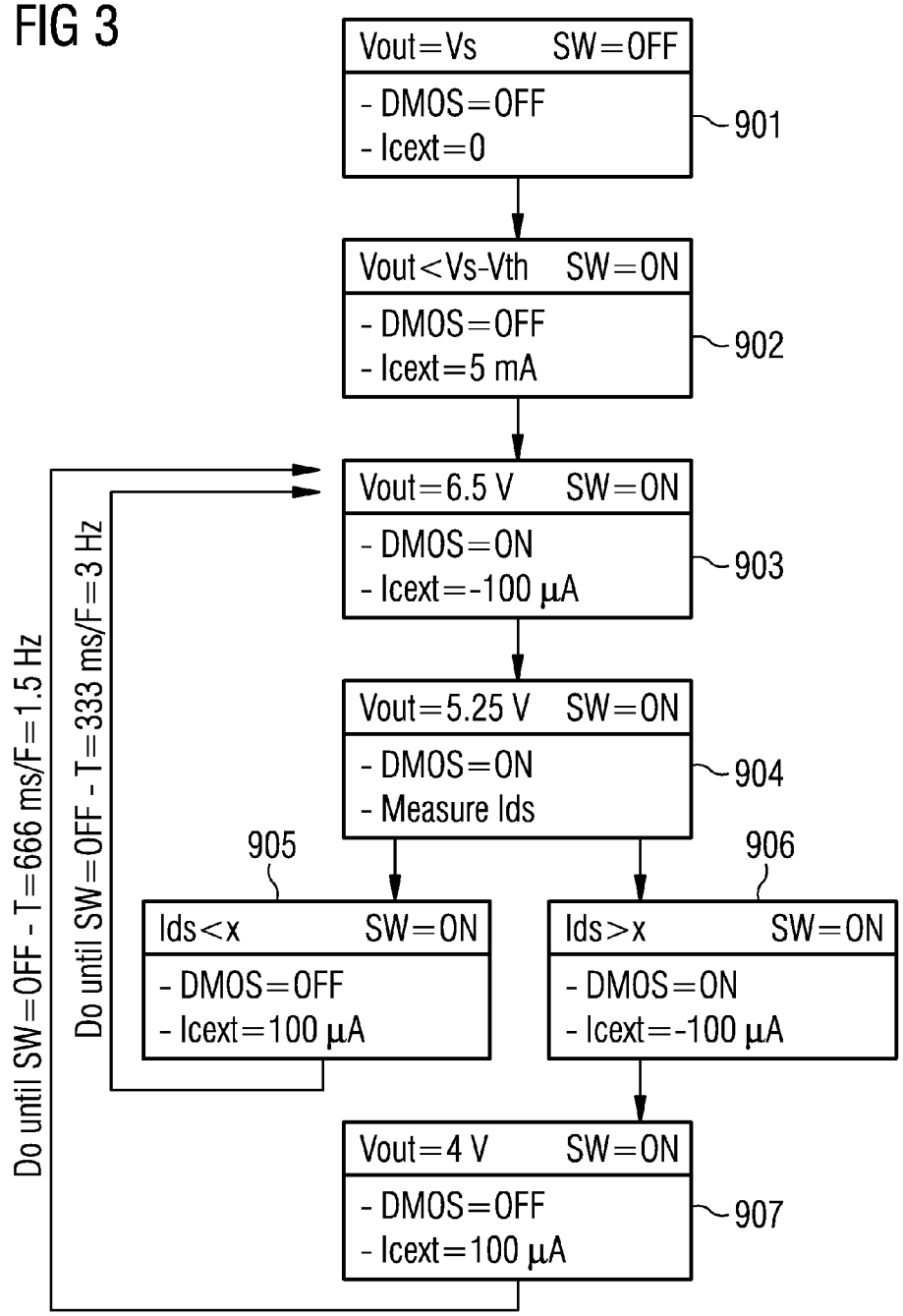

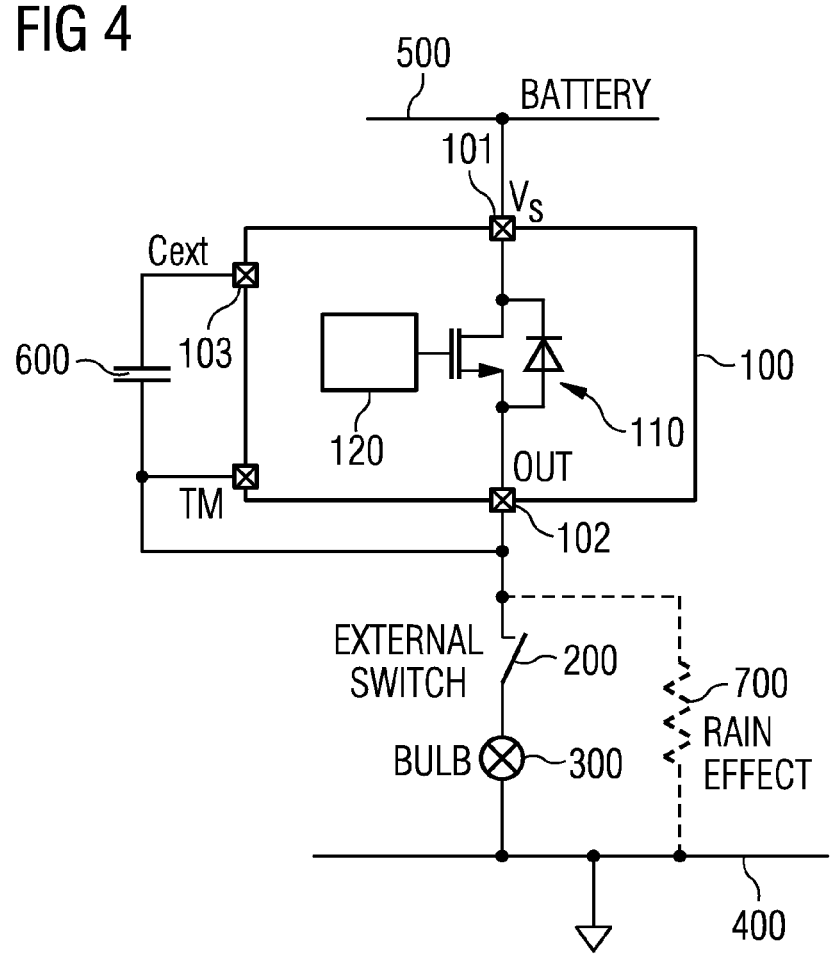

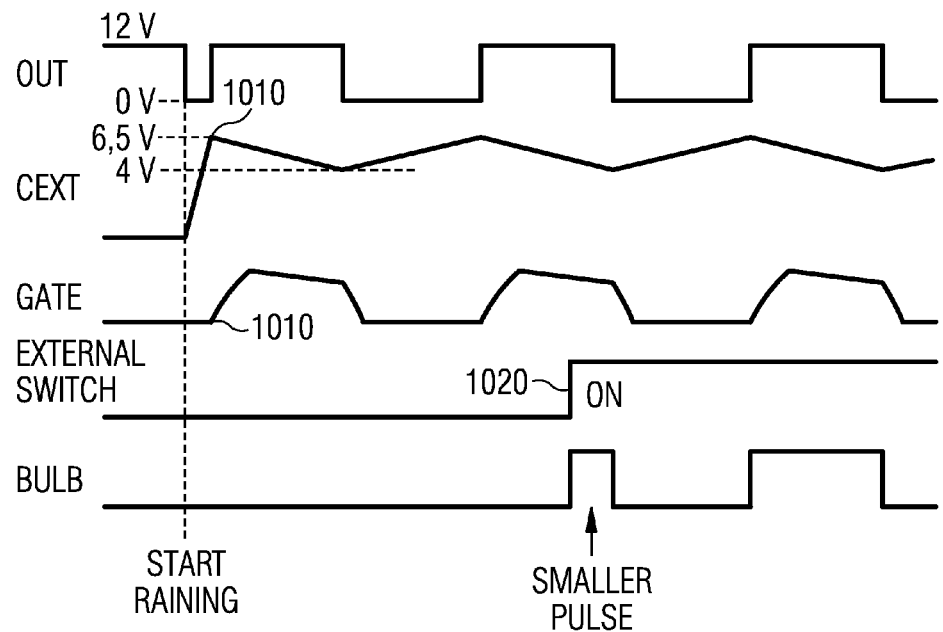
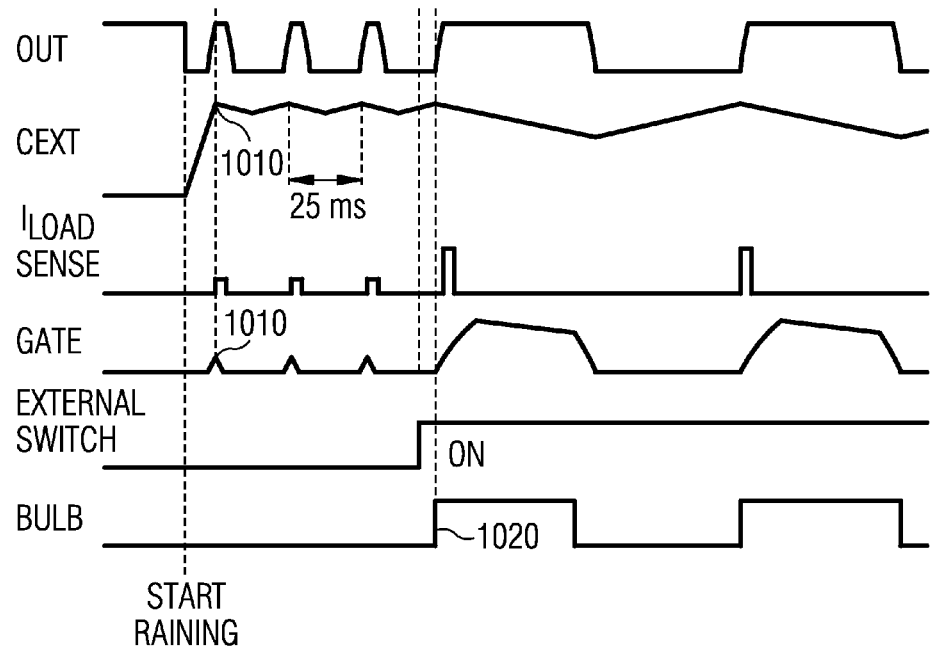

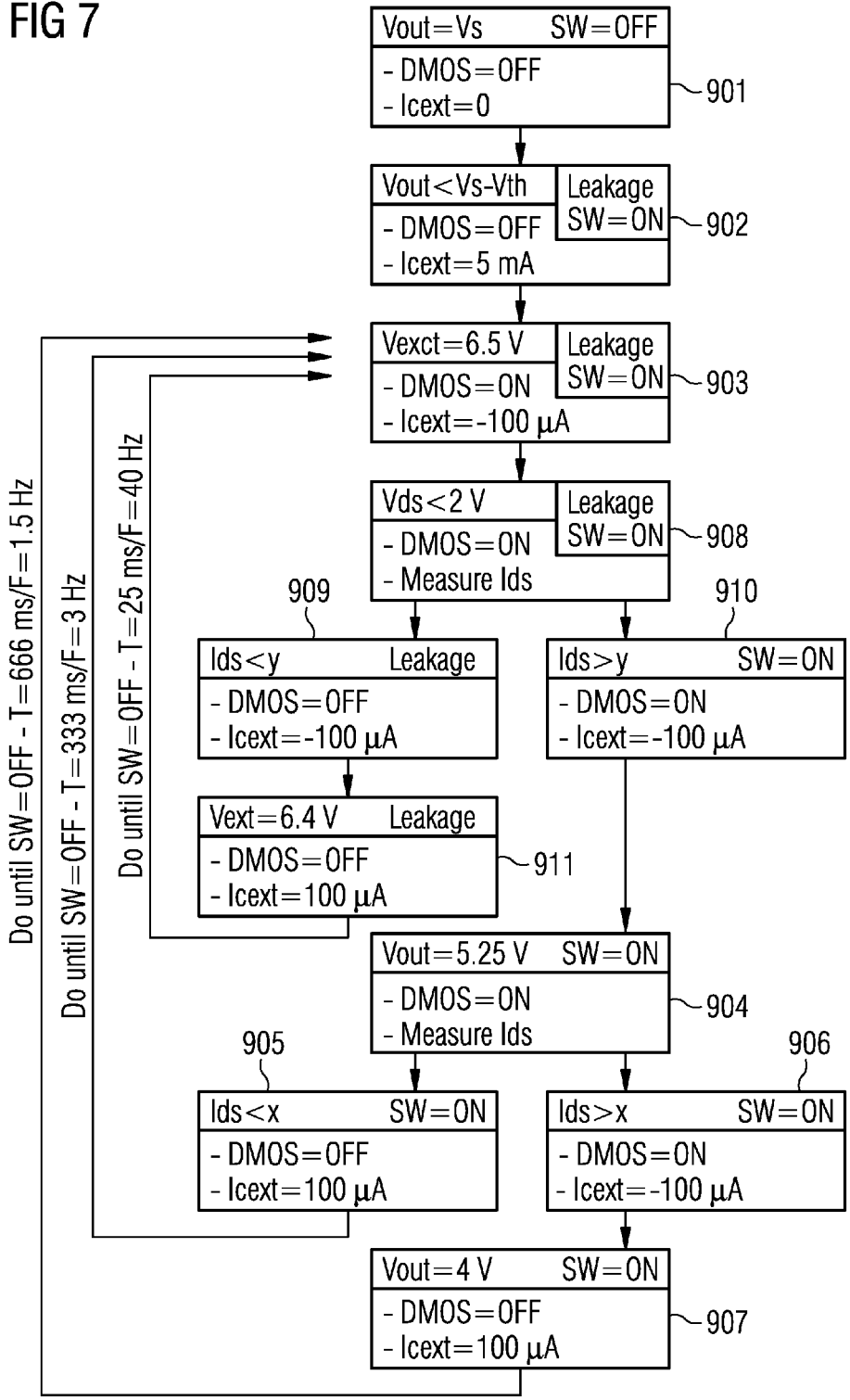

DIRECTION INDICATOR CIRCUIT FOR CONTROLLING A DIRECTION INDICATOR IN A VEHICLE

CROSS-REFERENCE TO RELATED APPLICATION

This application claims priority to German Patent Application Serial No. 10 2012 018 942.7, which was filed on Sep. 25, 2012, and is incorporated herein by reference in its entirety.

TECHNICAL FIELD

Various embodiments relate to a direction indicator circuit for actuating a direction indicator in a vehicle.

BACKGROUND

Indicators for the direction of travel, referred to as direction indicators, are required for applications in vehicles. A direction indicator has the function of using a lighting means to indicate to other road users if the road user wishes to change the direction of travel. Direction indicators have been implemented electromechanically, efforts being made to replace these electromechanical solutions by more economical electronic ones. A contemporary direction indicator is composed of a direction indicator circuit, a direction indicator switch and a plurality of lighting means, for example incandescent lamps. Since an electronic solution is intended to replace an established electromechanical solution, value is placed on a direction indicator circuit which is as economical as possible and on an overall solution which is an economical as possible. The direction indicator circuit, the direction indicator switch and the lighting means are connected in series between the supply voltage and the vehicle ground or a ground terminal of the vehicle. If the direction indicator switch is closed, the lighting means is to flash with a defined frequency, that is to say light up or not light up periodically. The frequency is defined as 1.5 Hz or 3 Hz, wherein the frequency of 3 Hz indicates a fault in a lighting means.

Direction indicator circuits in vehicles are used in environments which are very demanding in terms of the robustness and the reliability of the direction indicator circuit and the direction indicator per se. Direction indicators are subject to low and high temperatures, a high degree of humidity, to soiling and dirt of all types. Owing to these stresses, a conductive path can be formed between the direction indicator circuit and the vehicle ground. If such a path is present, the capacitor can be charged even though the direction indicator circuit is not closed. If the capacitor is sufficiently charged, the direction indicator circuit also operates. That is to say that the direction indicator circuit opens its internal switch and closes. This does necessarily have to bring about unintended lighting up of the direction indicator since the direction indicator switch is open. The problem arises that the direction indicator circuit is not started from a defined operating state. This may result in a situation in which the first time period in which the lighting means of the direction indicator lights up the first time is too short. In the worst conceivable case it may be that the direction indicator switch is closed while the switch of the direction indicator circuit has just been switched off. In this case, the capacitor will not charge as quickly as possible, as in the case of normal powering up, but instead with a charge current which is typical of the off state, with the result that the time until the lighting means of the direction indicator first lights up is greatly lengthened.

Such a moment at which the lighting means of the direction indicator lights too briefly is undesired and is to be avoided.

SUMMARY

In various embodiments, a direction indicator circuit for controlling a direction indicator in a vehicle is provided. The direction indicator circuit may include: a first terminal for connecting to a supply voltage; a second terminal for connecting to a direction indicator switch and a lighting means; a third terminal for connecting to a capacitor; and a switch for providing a current, wherein the switch is connected to the first terminal and to the second terminal; wherein the direction indicator circuit is designed to provide the lighting means with a current during an on state using the switch and with no current during an off state; wherein during the on state the direction indicator circuit checks the provided current at least once and goes into the off state if the check detects a current which is lower than a predefined current.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a flow chart relating to the sequence in a direction indicator circuit;

FIG. 4 shows a direction indicator with a direction indicator circuit and a parasitic resistance;

FIG. 5 shows signal profiles;

FIG. 6 shows signal profiles; and

FIG. 7 shows a flow chart relating to the sequence in a direction indicator circuit.

DESCRIPTION

Figure 1:
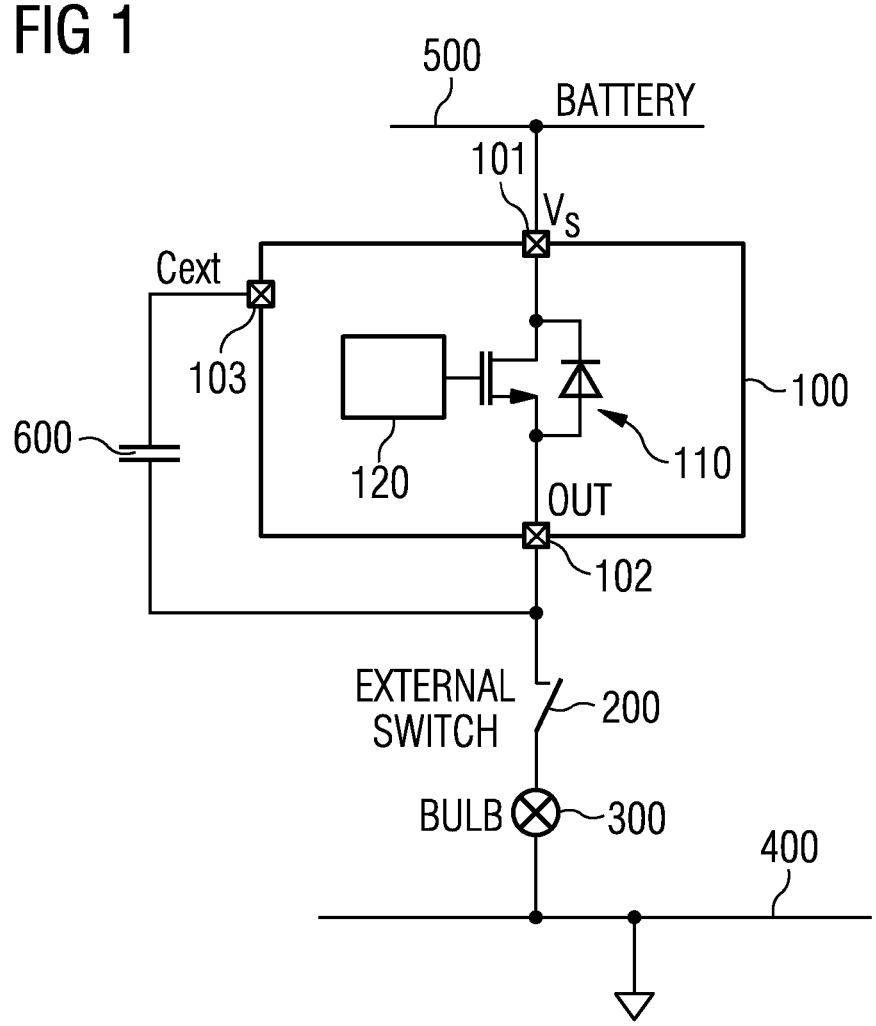
FIG. 1 shows a direction indicator with a direction indicator circuit.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide a direction indicator circuit for which excessively brief first lighting up of the lighting means of the direction indicator is avoided.

A simple semiconductor circuit is used as the direction indicator circuit, which semiconductor circuit only has to have three terminals, one terminal for connecting a supply voltage, one terminal for connecting a vehicle ground or a ground terminal of the vehicle. A third terminal serves to connect a capacitor. This capacitor fulfils two functions: on the one hand this capacitor serves to supply voltage to the direction indicator circuit, and on the other hand it serves as a capacitor for implementing an oscillator using the direction indicator circuit. Direction indicator circuits have a high side switch which in an on state provides a current for the lighting means. During the on state, the voltages within the direction indicator circuit such as, for example, the gate voltage of the high side switch, are higher than the supply voltage. The connected capacitor therefore performs the function of a boot strap capacitor. During the on state, the connected capacitor is discharged. During an off state, the voltages within the direction indicator circuit, such as, for example, the gate voltage of the high side switch, are lower than the supply voltage. During the off state, the connected capacitor is charged. By using these charging and discharging times it is possible to define the frequency of the direction indicator circuit and of the direction indicator device per se. The direction indicator circuit is activated by the direction indicator switch. If the direction indicator switch is closed or at a low impedance, a flow of current through the direction indicator circuit and through the direction indicator lighting means becomes possible. The direction indicator circuit firstly charges the capacitor. As soon as the capacitor is charged, the direction indicator circuit starts. After the start of the direction indicator circuit, it closes its internal switch and therefore permits a flow of current through the lighting means of the direction indicator. The direction indicator circuit opens and closes the internal switch with a frequency of 1.5 Hz.

The direction indicator circuit for controlling a direction indicator in a vehicle comprises a first terminal for connecting to a supply voltage, a second terminal for connecting to a direction indicator, a third terminal for connecting to a capacitor and a switch for providing a current. The switch is connected to the first and the second terminals. The direction indicator circuit is designed to provide the direction indicator with a current during an on state using the switch and with no current during an off state. During the on state, the direction indicator circuit checks the provided current at least once and goes into the off state if the check detects a current which is lower than a predefined current.

If the capacitor is discharged to such an extent that the direction indicator circuit is operational, the direction indicator circuit cannot readily determine, due to its simple and cost-effective design, whether the switch is open or closed. The direction indicator circuit instead behaves as if the switch were closed, since under normal circumstances this constitutes a requirement for operation and therefore a requirement for a charged capacitor. An operational voltage is made available to the direction indicator circuit by means of the charged capacitor, with the result that the direction indicator circuit is operational. If the direction indicator circuit is operational, the internal switch is opened and closed periodically. During the on state, the switch is closed and the external capacitance is discharged. During this phase, the current which flows through the switch is checked. If the check or the measurement of the current reveals a current which is substantially smaller than the current which flows through the switch when a lighting means of the direction indicator is connected via a closed direction indicator switch, a leakage current is present. If it has been detected in this way that the current is not flowing through any lighting means of the direction indicator, the switch is opened again or switched off. The switching off of the switch causes the direction indicator circuit to go into the off state again, and the capacitor is charged again by the direction indicator circuit.

The direction indicator circuit goes into the on state when the voltage of the capacitor exceeds an upper threshold. The checking for leakage currents can be advantageously carried out shortly after the direction indicator circuit has gone into the on state. In this way, the voltage of the capacitor is essentially retained so that the direction indicator circuit is always in the defined state even when leakage currents are present.

During the on state, the direction indicator circuit can check the voltage present across the switch and go into the off state if the check detects a voltage which is lower than a predefined switch voltage. This provides the particular advantage that a leakage current is already detected early, for example just after the transition into the on state.

The direction indicator circuit can firstly check the voltage present at the switch and then check the provided current if the checking of the voltage detects a voltage which is lower than the predefined circuit voltage. This provides the particular advantage that the presence of a leakage current is checked twice.

The switch of the direction indicator circuit may be a MOSFET and the voltage which is present may be a drain-source voltage. The direction indicator circuit may firstly check the drain-source voltage present at the MOSFET. If the checking of the drain-source voltage detects a voltage which is lower than the predefined voltage, the provided current may then be checked. The predefined voltage may be, for example, 2 V.

FIG. 1 shows a direction indicator with a direction indicator circuit 100, a direction indicator switch 200 and a lighting means 300 of a direction indicator. The direction indicator circuit 100 is connected by a first terminal 101 to a supply voltage 500. A second terminal 102 of the direction indicator circuit is connected to the direction indicator switch 200. The direction indicator switch 200 is connected to the lighting means 300. The arrangement of the direction indicator switch 200 and of the lighting means 300 can be interchanged. A capacitor 600 is connected to the third terminal 103 of the direction indicator switch 100. In this arrangement, the direction indicator circuit 100 replaces electromagnetic components. Owing to the conservative development of the vehicle industry it is often necessary for the electronic components which are intended to replace the electromechanical or mechanical components to comply with the specifications of the original components.

If the direction indicator switch 200 is off, i.e. open, and if the arrangement is in equilibrium, that is to say the direction indicator circuit has already been open for a long time, no current can flow through the arrangement. Since no current flows through this arrangement, the direction indicator circuit is also currentless, i.e. there is no supply voltage present at the direction indicator circuit. The lighting means 300 does not light up. In this state the total supply voltage is present at the direction indicator switch 200. The supply voltage is present between the supply voltage terminal 500 and a ground terminal 400. The supply voltage can be provided, for example, by a battery or a generator. The direction indicator switch 200 can be mounted, for example, on a dashboard of an automobile or on a handlebar of a motor cycle. Instead of a lighting means 300, a plurality of lighting means can also be used. The direction indicator switch 200 can be a multi-path switch which enables a direction indication.

If the direction indicator switch 200 is closed, a current can flow through the direction indicator circuit 100 and through the lighting means 300. In this starting phase, this current flows through the direction indicator circuit 100, wherein the direction indicator circuit 100 diverts this current, which flows into the first terminal 101, to the third terminal 103, with the result that the capacitor 600 is charged. The current is so high that the capacitor 600 is charged in an appropriate time, and so low that the lighting means 300 does not light up. During this starting phase in which the voltage at the capacitor rises, all the circuit components of a control circuit 120 of the direction indicator circuit 100 begin to operate. After all the circuit components of the control circuit 120 have begun to operate and the voltage at the capacitor 600 exceeds an upper threshold, the direction indicator circuit ends the starting phase and goes into an on state. The starting phase should be terminated within 50 ms.

The direction indicator circuit 100 has a switch 110. This switch 110 may be embodied, for example, as a high side switch, wherein this high side switch can be embodied as an NMOS. The switch 110 may, for example, also be embodied as a switch 110 using GaN technology or SiC technology. If the direction indicator arrangement is symmetrical along the horizontal line, or the supply voltage terminal 500 and the ground terminal 400 are interchanged, the switch 110 may also be embodied as a low side switch. The switch 110 may be embodied as a PMOS using a fourth terminal.

During the on state, the switch 110 is closed. Since both the switch 110 and the direction indicator switch 200 are then closed, the entire voltage drops across the lighting means 300, with the result that the lighting means 300 lights up. The voltage at the third terminal is, with respect to the ground terminal 400, in the on state above the voltage at the first terminal. That is to say the direction indicator switch 100 is supplied using the capacitor 600. The capacitor 600 is thereby discharged. If the voltage at the capacitor 600 drops below a lower threshold, the direction indicator circuit ends the on state and goes into the off state.

During the off state, the switch 110 is open. Since the switch 110 is then open but the direction indicator switch 200 is closed, the entire voltage drops across the direction indicator switch 200, with the result that the lighting means 300 does not light up. The voltage at the third terminal is, with respect to the ground terminal 400, in the off state below the voltage at the first terminal. This means that the direction indicator circuit 100 can charge the capacitor 600. If the voltage at the capacitor exceeds the upper threshold, the direction indicator circuit ends the off state and goes into the on state.

Figure 2:
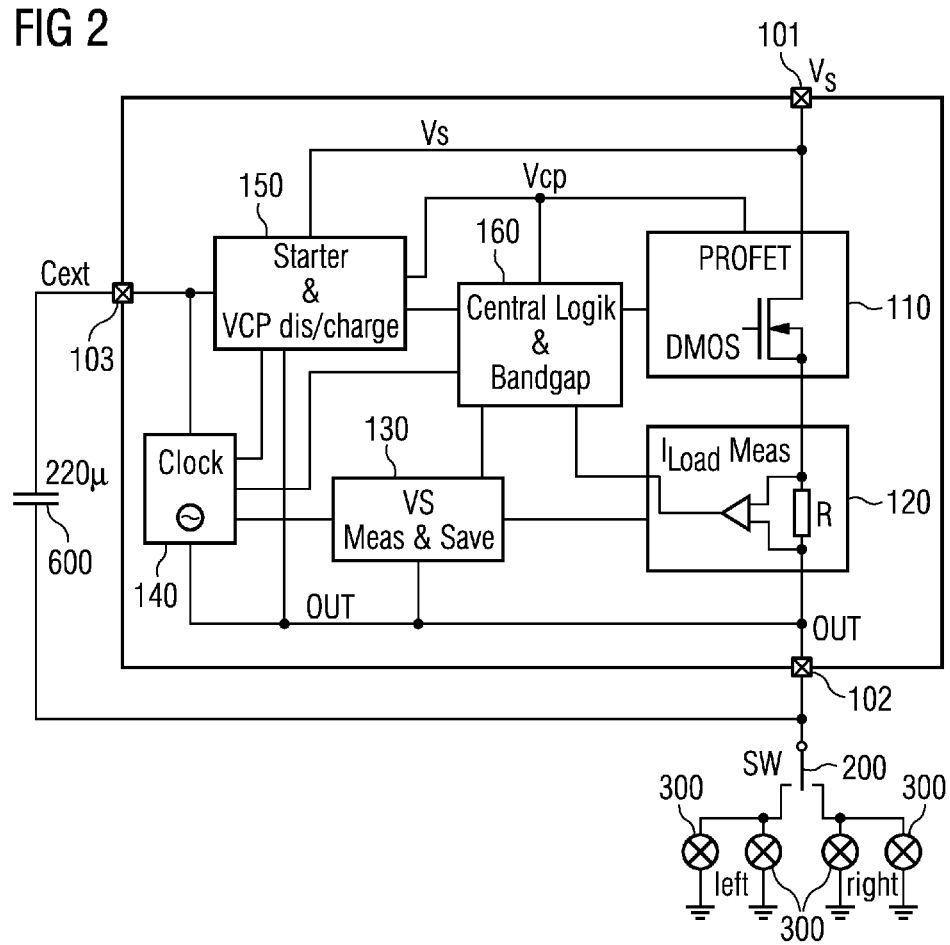
FIG. 2 shows a direction indicator with a direction indicator circuit.

FIG. 2 shows a detailed embodiment of the direction indicator circuit. The direction indicator circuit has a measuring circuit 120 which is designed to measure the current through the switch 110. The direction indicator circuit 100 has an evaluation and storage circuit 130 which is designed to evaluate and/or store measured values. The direction indicator circuit 100 has a clock generator 140 which is designed to generate a clock. The direction indicator circuit 100 has a logic circuit 160 which is designed to provide a bandgap voltage, to provide a reference current and to provide a logic which administers the on state, the off state and the starting phase. The direction indicator circuit has a supply circuit 150 which is designed to charge the capacitor 600 during the starting phase, discharge the capacitor during the on state, charge the capacitor during the off state, provide at least one supply voltage for the measuring circuit 120, the evaluation and storage circuit 130, the clock generator 140 and the logic circuit 160, and to provide at least one bias current for at least one of the measurement circuit 120, the evaluation and storage circuit 130, the clock generator 140 and the logic circuit 160.

FIG. 3 shows a flow chart of the sequence in a direction indicator circuit 100. In a first state 901, the direction indicator switch 200, SW, is off. The switch of the direction indicator circuit 110, DMOS, is off. No current flows into the capacitor 600. In a second state 902, the direction indicator switch 200 SW is closed, i.e. on. The capacitor 600 is charged with a current of 5 mA. In a third state 903, the direction indicator switch 200, SW is closed, i.e. on. If the capacitor voltage reaches an upper threshold of, for example 6.5 V, the switch 110, DMOS is closed, or switched on. Since the greater part of the voltage of the supply voltage terminal 500 now drops across the lighting means 300, the voltage at the third terminal is higher than the voltage at the supply voltage terminal 500. The direction indicator circuit 100 is then supplied with voltage by the capacitor 600. In order to supply the direction indicator circuit 100, a discharge current 100 μA is extracted from the capacitor 600, i.e. the capacitor is discharged. This discharge current must be set precisely since the duration of the on state is determined by means of this current and a further threshold which will be explained below. The duration of the on state is defined by the size of the capacitor 600, the magnitude of the discharge current and the magnitude of the further threshold. In a fourth state 904, the direction indicator switch 200, SW is closed, i.e. on. If the capacitor voltage reaches a first lower threshold of, for example, 5.25 V, the current of the switch 110 is checked. If the current of the switch 110 DMOS is lower than a first current threshold, the direction indicator circuit 100 changes into the off state or into a fifth state 905. In this fifth state 905, the switch 110, DMOS is opened or off. The capacitor is charged with a current of 100 μA. If the voltage at the capacitor 600 reaches the upper threshold again, the direction indicator circuit 100 goes into the third state 903 again. The fifth state 905 can be reached, for example, if one of at least two lighting means 300 is defective, with the result that a current flows which is lower than an expected current. In this case, the direction indicator will flash with a higher frequency in order to indicate to a user that a defect is present. If the current of the switch 110 DMOS is larger during the fourth state 904 than a first current threshold, the direction indicator circuit changes into a sixth state 906. In this sixth state 906, the switch 110 DMOS is closed, i.e. on. The capacitor is discharged with a current of 100 μA. A seventh state is reached if the capacitor voltage reaches a second lower threshold of, for example, 4 V. In this seventh state 907, the switch 110 DMOS is closed, or on. The capacitor is discharged with a current of 100 μA. If the voltage at the capacitor 600 reaches the upper threshold again, the direction indicator circuit 100 goes into the third state 903 again. The seventh state 907 can be reached, for example, if none of at least one lighting means 300 is defective, with the result that a current flows which is as high as an expected current. In this case, the direction indicator is to flash with a normal frequency in order to indicate to a user that there is no defect.

The values of the thresholds are only exemplary values which can vary from one direction indicator circuit 100 to another direction indicator circuit 100. A change in the manufacturing technology of the direction indicator circuit 100 can lead to adaptation of these thresholds.

FIG. 4 shows a direction indicator with a direction indicator circuit 100, a direction indicator switch 200 and a lighting means 300 of a direction indicator which differs from the direction indicator shown in FIG. 1 in that a leakage resistance 700 is shown. This leakage resistance 700 is of a parasitic nature, for which reason it is shown by dashed lines in FIG. 4. This leakage resistance 700 can occur if a current path is formed to the second terminal 102 due to rain, dirt or other environmental influences or production influences. As a result of this current path, or as a result of this leakage resistance 700, a current flows through the direction indicator circuit 100. The processes which are triggered by this leakage resistance 700 in the direction indicator circuit 100 are described in FIG. 5.

FIG. 5 shows signal profiles. The first signal from the top shows the voltage at the second terminal 102, out. The second signal from the top shows the voltage of the capacitor 600. The third signal from the top shows the voltage at the gate of a switch 110 which is embodied as an MOS. The fourth signal from the top shows the voltage at the direction indicator switch 200. The fifth signal from the top shows the voltage at the lighting means 300. The dashed vertical line on the left-hand side of FIG. 5 ("start raining") shows the occurrence of the leakage resistance 700. This occurrence can be caused, for example, by rain. The capacitor is charged owing to the leakage resistance. The direction indicator circuit begins to operate and switches the switch 110 or the MOS on at a time 10.10. Starting from this time 10.10, the direction indicator circuit periodically runs through the third, fourth and fifth states 903, 904, 905.

At another time 10.20, for example the direction indicator switch 200 is closed. In FIG. 5 this event occurs, for example, in the third state 903. Since the capacitor 600 was already partially discharged, the time for which the lighting means 300 lights up is too short. This is undesired. If the direction indicator switch 200 is closed, when the direction indicator circuit is in the fifth or sixth state, the capacitor continues to be charged with the charge current of, for example, 100 µA, without the switch 110 or MOS being closed. This results in the lighting means 300 beginning to light up after a time which can be longer than the time which the starting phase takes. This is undesired.

FIG. 6 shows signal profiles. The first signal from the top shows the voltage at the second terminal 102, out. The second signal from the top shows the voltage of the capacitor 600. The third signal from the top shows the voltage at an output of the measuring circuit 120, wherein the measuring circuit is designed to measure the current of the switch 110. The fourth signal from the top shows the voltage at the gate of a switch 110 which is embodied as an MOS. The fifth signal from the top shows the voltage at the direction indicator switch 200. The sixth signal from the top shows the voltage at the lighting means 300. The dashed vertical line on the left-hand side of FIG. 5 ("start raining") shows the occurrence of the leakage resistance 700. New terms are explained in more detail in the following flow chart in FIG. 7. The capacitor is charged owing to the leakage resistance. The direction indicator circuit begins to operate and switches the switch 110 or the MOS on at a time 10.10. In an eighth state 908, which follows the third state 903, the voltage at the switch 110 or MOS is checked. If, for example, the drain-source voltage at the MOS is lower than a switch threshold of, for example, 2 V, the current of the switch 110 is checked. If the current is lower than a second current threshold, the direction indicator circuit 100 goes into the seventh state 907. If the current is higher than a second current threshold, the direction indicator circuit 100 goes into the ninth state 909. If the direction indicator circuit 100 has gone into the tenth state 910, no leakage resistance was detected and the direction indicator circuit goes into the fourth state 904 and therefore into the normal operating mode. If the direction indicator circuit 100 has gone into the ninth state 909, a leakage resistance was detected and the direction indicator circuit goes into the eleventh state 911. If the capacitor voltage has reached a third lower threshold, of, for example, 6.4 V, the direction indicator circuit 100 goes into the third state 903 again. The third, lower threshold can therefore be selected in such a way for example that it differs only slightly from the upper threshold, it can be, for example, 6.4 V, which is 100 mV below the upper threshold of, for example, 6.5 V. If the capacitor is selected with, for example, 10 µF, this corresponds to a time of 10 ms to 20 ms in the case of a discharge current of 50 to 100 µA. This time is shorter than the required time of 50 ms. 50 ms corresponds to a time in which the human eye does not perceive such a change.

The signal profiles of FIG. 6 show that the direction indicator circuit 100 detects a leakage current after the time 10.10. Whenever a leakage current is detected the direction indicator circuit 100 stops the switching on of the switch 110 or the charging of the gate of the MOS. The charging of the capacitor 600 remains at a high level. If the direction indicator switch 200 is closed at the time 10.20, the direction indicator circuit 100 either goes into the third state 903 after a brief delay, or is already in the third state 903. This delay is shorter than the permitted time of the starting phase. If the direction indicator circuit 100 is already in the third state 903, the period for which the lighting means lights up is somewhat shorter, but still in a permitted range.

FIG. 7 shows a flow chart relating to the sequence in a direction indicator circuit. This flow chart differs from the flow chart shown in FIG. 3 in that it has additional states. The direction indicator circuit begins to operate and is in the third state 903. The switch 110 is closed or the MOS is on. In an eighth state 908, which follows the third state 903, the voltage at the switch 110 or at the MOS is checked. If, for example, the drain-source voltage at the MOS is lower than a switch threshold of, for example 2V, the current of the switch 110 is checked. If the current is lower than a second current threshold, the direction indicator circuit 100 goes into the ninth state 909. If the current is higher than a second current threshold, the direction indicator circuit 100 goes into the tenth state 910. If the direction indicator circuit 100 has gone into the tenth state 910, a leakage resistance was not detected and the direction indicator circuit goes into the fourth state 904 and therefore into the normal operating mode. If the direction indicator circuit 100 has gone into the ninth state 909, a leakage resistance was detected and the direction indicator circuit 100 goes into the eleventh state 911. If the capacitor voltage has reached a third lower threshold of, for example, 6.4 V, the direction indicator circuit 100 goes into the third state 903 again.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A direction indicator circuit for controlling a direction indicator in a vehicle, the direction indicator circuit comprising:
   a first terminal directly connected to a supply voltage;
   a second terminal for connecting to a direction indicator switch and a lighting means;
   a third terminal for connecting to a capacitor; wherein the third terminal is directly connected to the first terminal; and
   a switch for providing a current, wherein the switch is directly connected to the first terminal and to the second terminal;
   wherein the direction indicator circuit is designed to provide the lighting means with a current during an on state using the switch and with no current during an off state;
   wherein during the on state the direction indicator circuit checks the provided current at least once and goes into the off state if the check detects a current which is lower than a predefined current.

2. The direction indicator circuit of claim 1,
   wherein during the on state the direction indicator circuit checks the voltage which is present across the switch and goes into the off state if the check detects a voltage which is lower than a predefined switch voltage.

3. The direction indicator circuit of claim 2,
   wherein the direction indicator circuit firstly checks the voltage which is present at the switch and then checks the provided current if the checking of the voltage detects a voltage which is lower than the predefined switch voltage.

4. The direction indicator circuit of claim 1,
   wherein the switch is a metal oxide semiconductor field effect transistor and the voltage which is present is a drain-source voltage.

5. The direction indicator circuit of claim 1,
   wherein the direction indicator circuit goes from the off state into the on state if a voltage between the second terminal and the third terminal exceeds a specific upper value.

6. A direction indicator circuit for controlling a direction indicator in a vehicle, the direction indicator circuit comprising:
   a first terminal for connecting to a supply voltage;
   a second terminal for connecting to a direction indicator switch and a lighting means;
   a third terminal for connecting to a capacitor; and
   a switch for providing a current, wherein the switch is connected to the first terminal and to the second terminal;
   wherein the direction indicator circuit is designed to provide the lighting means with a current during an on state using the switch and with no current during an off state;
   wherein during the on state the direction indicator circuit checks the provided current at least once and goes into the off state if the check detects a current which is lower than a predefined current;
   wherein the direction indicator circuit checks the voltage present at the switch and then checks a provided current if the voltage check detects a voltage lower than a predefined switch voltage.

7. A direction indicator circuit for controlling a direction indicator in a vehicle, the direction indicator circuit comprising:
   a first terminal directly connected to a supply voltage;
   a second terminal for connecting to a direction indicator switch and a lighting means;
   a third terminal for connecting to a capacitor; wherein the third terminal is directly connected to the first terminal; and
   a p-channel metal oxide semiconductor field effect transistor switch for providing a current, wherein the switch is directly connected to the first terminal and to the second terminal;
   wherein the direction indicator circuit is designed to provide the lighting means with a current during an on state using the switch and with no current during an off state;
   wherein during the on state the direction indicator circuit checks the provided current at least once and goes into the off state if the check detects a current which is lower than a predefined current.

* * * * *